United States Patent [19]

Davis

[11] Patent Number: 4,998,110
[45] Date of Patent: Mar. 5, 1991

[54] POWER STABILIZER AND ISOLATION/COUPLER NETWORK

[75] Inventor: John W. Davis, San Diego, Calif.

[73] Assignee: Radar Control Systems Corporation, San Diego, Calif.

[21] Appl. No.: 376,320

[22] Filed: Jul. 6, 1989

Related U.S. Application Data

[63] Continuation-in-part of Ser. No. 193,393, May 12, 1988, Pat. No. 4,916,450.

[51] Int. Cl.$^5$ .......................... G01S 13/93; G01S 7/03
[52] U.S. Cl. ....................................... 342/70; 342/175; 455/86
[58] Field of Search ................. 342/175; 333/113, 114; 455/86, 328, 325, 324; 372/27, 28, 70-72

[56] References Cited

U.S. PATENT DOCUMENTS 3,297,967 1/1967 Hunton ................................. 333/113
4,157,549 6/1979 Davis ..................................... 342/28

Primary Examiner—Gilberto Barrón, Jr.
Attorney, Agent, or Firm—Frank D. Gilliam

[57] ABSTRACT

The invention is directed to a directional coupler for coupling together a radar frequency transmitter to a combined transmitting and receiving antenna, a power absorber and a receiver. A tunable stub is employed to reflect a selected amount of transmitted energy to the local oscillator (LO) of the receiver for mixing with the incoming received signal. The coupler can be constructed from any known type RF transmission line suitable for passing or coupling signals of radar frequencies. A significant amount of the transmitter power is absorbed in a power absorbing RF load allowing only a small amount to be transmitted from the antenna and a still smaller amount fed back as LO to the receiver. The invention works equally as well on a disk type antenna and a phased array antenna.

12 Claims, 2 Drawing Sheets

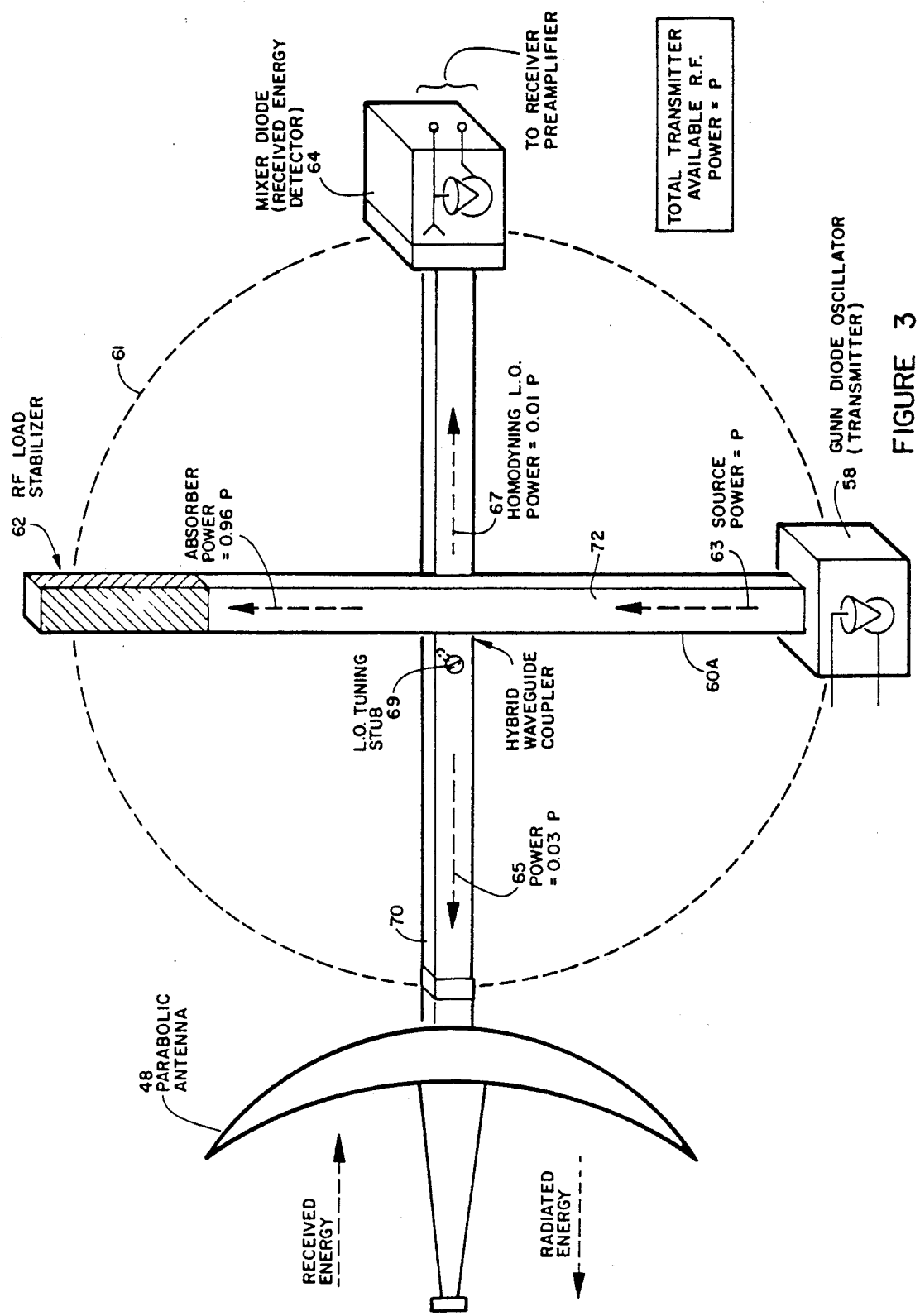

4,998,110

POWER STABILIZER AND ISOLATION/COUPLER NETWORK

RELATED APPLICATION

This is a continuation-in-part of copending application Ser. No. 07/193,393 filed on 05/12/88 now U.S. Pat. No. 4,916,450.

BACKGROUND OF THE INVENTION

The present invention is directed to a directional coupler device for a radar system for coupling the power from a transmitter to a transmitting antenna without the use of a circular coupler. In my previous U.S. Pat. No. 4,673,937, FIG. 2A depicts the transmitter 58 transmitting power through a directional coupler 60 into a circulator/coupler 49 and an RF load 62. The output of the circulator/coupler 49 supplies energy to a receiver 64 and the transmitting/receiving antenna 48.

The circuit described above is discussed fully in the referenced U.S. Pat. No. 4,673,937 and provides an efficient method of transmitting and receiving signals from a radar transmitter. However, the circuit is adversely affected by strong magnetic fields resulting in irregular and/or inaccurate performance.

There has been a continuing and long standing need for a microwave device for a small radar system that solves the aforementioned problem. The coupler of this invention satisfies this need as well as providing other advantages to be described below.

OBJECTS OF THE INVENTION

A primary object of the present invention is to provide a device which overcomes the aforementioned problem.

Another object of this invention is to produce a hybrid RF directional coupler device for use with a radar system using CW or pulse doppler.

Another object of this invention is to provide such an RF device that eliminates reflected signals from the antenna entering the transmitter rather than the receiver.

Yet another object of this invention is to provide an RF transmission device for a radar system which eliminates the need for a circulator/coupler between the transmitter, receiver and antenna.

Still another object of this invention is to provide a hybrid RF frequency directional coupler which is relatively simple and inexpensive to produce and yet will be accurate and reliable in performance.

SUMMARY OF THE INVENTION

The present invention is directed to a hybrid directional coupler for use in coupling transmitted energy simultaneously from a low powered transmitter to a transmit and receive antenna, to a receiver for mixing and to a frequency stabilizing load in a nonreactive and efficient and practical manner.

The coupler comprises an RF transmission line type coupler constructed of wave guide, strip line or any other medium suitable for the purpose intended. The transmitter transmits power directly into the load which absorbs a selected quantity of the transmitted power and does not reflect any significant power back into the transmitter or the RF transmission lines. The remaining power from the transmitter that is not absorbed by the stabilizing load is coupled to the antenna and a lesser amount than the amount being transmitted to the antenna is reflected back by microwave means associated with the RF transmission line. The reflected signal power is used for the local oscillator signal power which is mixed with the echo signal received by the antenna in a typical manner as described in my above referenced U.S. Patent.

The directional coupler of the invention is suitable for use with any type and output power RF frequency radar system or any other system used for transmitting signals and receiving echo signals from targets impacted by the transmitted signal which use homodyning receivers.

BRIEF DESCRIPTION OF THE DRAWING FIGURES

FIG. 3 is a detailed schematic showing of a preferred hybrid directional coupler of the present invention.

DETAILED DESCRIPTION OF THE PREFERRED EMBODIMENT OF THE INVENTION

An automotive radar system in which the directional coupler of this invention can be utilized operates by way of example and not by way of limitation primarily in the continuous wave frequency shift keying mode (CW-FSK), at a center frequency of 24.125 GHz with a radiated power of approximately 0.8 milli watts (mw). The modulation system is multiplexed or triplexed FSK of the homodyne intermediate frequency type with a bandwidth from 1.0 Hz to 20 khz or higher. The system operates on the Doppler frequency shift principal to detect target return (echo) signal information.

Figure 1:
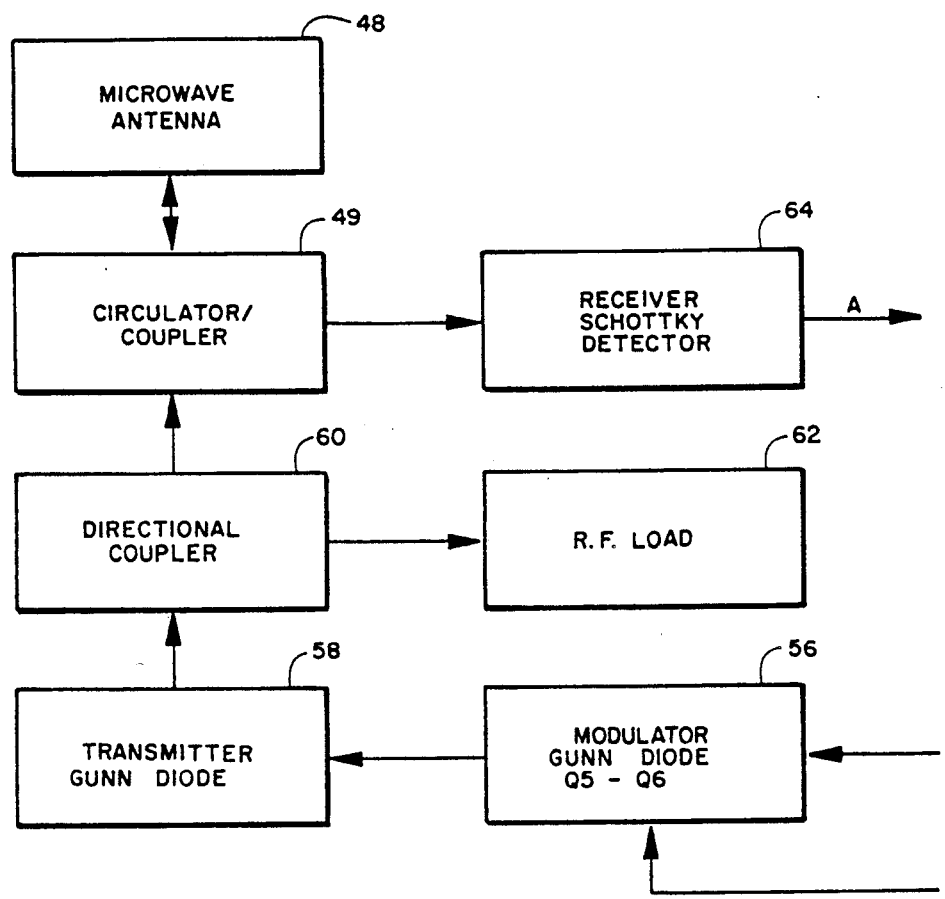
FIG. 1 is a block showing of the principle circuits of the prior art radar system in which the present invention can be utilized.
Figure 2:
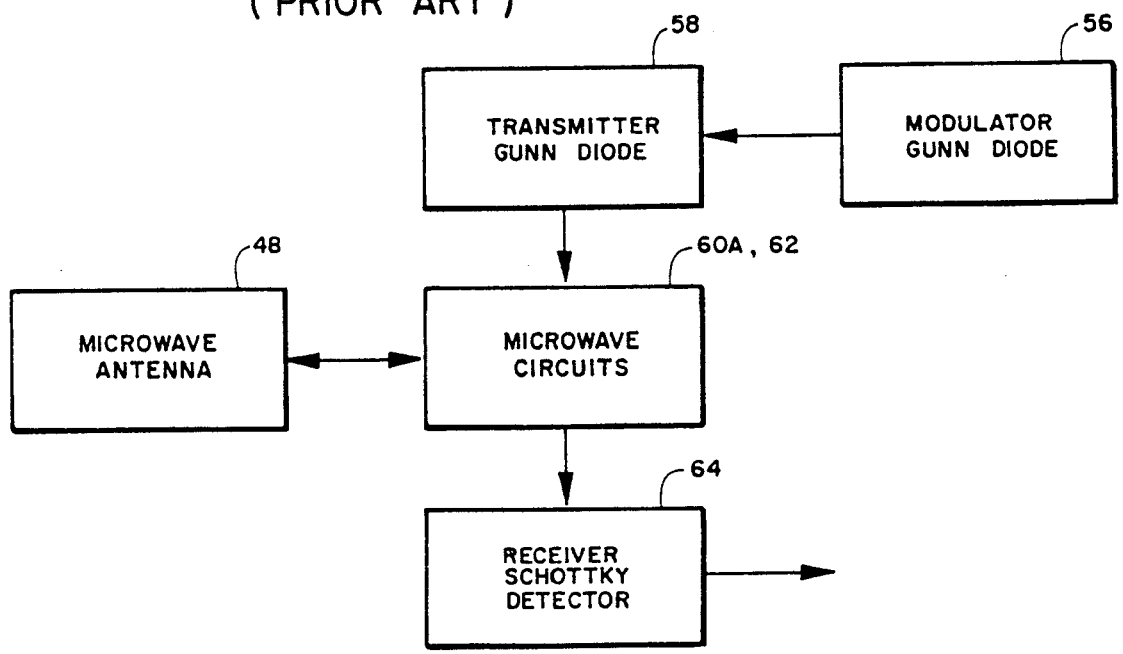
FIG. 2 is a modified showing of FIG. 1 with a hybrid directional coupler of the present invention incorporated therein.

Referring now specifically to drawing FIG. 1, this Figure is a block diagram showing of seven main functional circuits of the vehicle radar system of the prior art. These circuits and identifying reference numbers can be found in FIG. 1 as reference number 22 and in detail in FIG. 2A of U.S. Pat. No. 4,673,937. The new system of this invention eliminates the need for a circulator/coupler 49 of the prior art. Referring now to FIG. 2 which depicts a micro wave antenna 48, microwave circuits which includes directional coupler 60A of the invention RF load 62, receiver Shottky detector 64, and transmitter GUNN diode 58.

Referring now to drawing FIG. 3, this Figure depicts an enlarged showing of the directional coupler generally designated 60A of this invention in its operating environment. The dotted circle 61 encloses the directional coupler 60A of the invention. The transmitter GUNN diode 58 transmits radiation power in the direction of the arrow head 63 toward the isolation load 62. A portion of the transmitted power, about 96% as an example, goes to the load, about 3% of the remaining transmitter power is directed at the intersection of the arms 70 and 72 by any suitable means such as coupling holes, toward the antenna 48 in the direction of arrow head 65. The remaining 1% of the transmitted power is reflected back in the direction of arrow head 67 toward receiver 64 by a stub 69 in the shown embodiment. The exact amount of the reflected power into the receiver 64 for the purpose of homodyning is determined by the adjustment of stub 69 relative to arm 70. When the directional coupler is formed from waveguide or the like, the stub 69 may be in the form of a rod or a screw which is threaded through the wall of the waveguide and can be adjusted into and out of the inner hollow portion of the waveguide (not shown). The degree of reflected power is determined by the amount or depth of the stub into the inner hollow portion of the wave guide, i.e. the further the stub penetrates into the waveguide the more power is reflected into the receiver other types of reflectors or diverters (not shown) may also be employed.

As can be understood the directional coupler 60A replaces the directional coupler 60 and the circulator/coupler 49 of the prior invention.

Although the directional coupler of the invention takes the form of a wave hybrid guide assembly for the purpose of explanation it may take many different forms and shapes, for example, co-axial cable, printed circuit boards including strip line technology or any other conceivable conveyance of microwave energy may be employed.

The antenna 48 is shown as a dish type antenna. Obviously any type antenna can be used with the directional coupler of the invention, including but not limited to, a phase array antenna.

The load 62 can be any suitable RF power absorbing load material which has a minimum of reflected power therefrom. Loads for this purpose are well known in the art and per se do not form a part of this invention.

The transmitter and receiver are fully described in the cited prior art and per se are not a part of this invention.

The above described embodiment of this invention is merely descriptive of the principles and not to be considered limiting. The scope of this invention instead shall be determined from the scope of the following claims including their equivalent:

What is claimed is:

1. A directional coupler for coupling transmitted power from a transmitter a portion of which is absorbed in an stabilizing load, a portion directed to an antenna and a portion reflected back to a local oscillator of a receiver for homodyning purposes the directional coupler comprising:
   a microwave transmission means configured to transmit a majority of the power from said transmitter to said stabilizing load for absorbtion thereby to stabilize the transmitter, a small portion of the remaining power from said transmitter to a transmitting antenna and a yet smaller portion of said remaining transmitter power to be reflected back as local oscillator power into said receiver; and
   means for controlling the amount of said power that is reflected such as local oscillator power to said receiver.

2. The coupler as defined in claim 1 wherein said microwave transmission means comprises two perpendicular arms one end of one arm is adapted to be connected to said transmitter and the other end of said one arm to said stabilizing load, one end of the other arm is adapted to be connected to said transmitting antenna and the other end of said other arm to said receiver, said means for controlling the amount of power that is reflected back to the receiver is positioned intermediate the ends of said other arm and said antenna.

3. The coupler as defined in claim 2 wherein said means for simultaneously controlling the amount of power that is reflected back to said receiver is a stub adjustably mounted to said other arm.

4. The coupler as defined in claim 1 wherein said microwave transmission means is waveguide.

5. The coupler as defined in claim 1 where said microwave transmission means is a strip line circuit.

6. The coupler as defined in claim 1 wherein said microwave transmission means is coaxial cable.

7. The coupler as defined in claim 1 included in a collision avoidance system for automotive vehicles.

8. The coupler defined in claim 1 wherein said microwave transmission means transmits a majority of the power directly to said load.

9. The coupler defined in claim 1 wherein said microwave transmission means transmits over ninety percent of the power to said load.

10. An RF power transmission system comprising in combination, a power transmitter, an RF load, a transmit-receive antenna, a diode receiver and an RF transmission means configured to transmit a majority of the power from said transmitter to said stabilizing load for absorbtion thereby to stabilize the transmitter, a small portion of the remaining power from said transmitter to a transmitting antenna and a yet smaller portion of said remaining transmitter power to be reflected back as local oscillator power into said receiver.

11. A method of stabilizing a microwave transmitter in a homodyne transceiver system including a transmit and receive antenna, and a receiver, the steps comprising, directing a majority of the generated power from the transmitter to a load, directing a first portion of the generated power to the antenna, and directing a portion of said first portion of power to the receiver.

12. A method defined in claim 11 further including the step of directing a portion of said first portion of power through means of a discontinuity located in the path of the antenna.

* * * * *